United States Patent
Levas

(10) Patent No.: US 7,928,988 B1
(45) Date of Patent: Apr. 19, 2011

(54) METHOD AND SYSTEM FOR TEXTURE BLOCK SWAPPING MEMORY MANAGEMENT

(75) Inventor: Menelaos Levas, Nicosia (CY)

(73) Assignee: Nvidia Corporation, Santa Clara, CA (US)

( * ) Notice: Subject to any disclaimer, the term of this patent is extended or adjusted under 35 U.S.C. 154(b) by 330 days.

(21) Appl. No.: 10/993,640

(22) Filed: Nov. 19, 2004

(51) Int. Cl.
*G06F 13/00* (2006.01)
*G06F 12/02* (2006.01)
*G06T 11/40* (2006.01)

(52) U.S. Cl. ............... 345/537; 345/543; 345/552

(58) Field of Classification Search .......... 345/557, 345/582, 538, 544
See application file for complete search history.

(56) References Cited

U.S. PATENT DOCUMENTS

| | | | |
|---|---|---|---|
| 4,791,403 A | 12/1988 | Mitchell et al. | |
| 4,803,477 A | 2/1989 | Miyatake et al. | |
| 5,109,417 A | 4/1992 | Fielder et al. | |
| 5,227,789 A | 7/1993 | Barry et al. | |
| 5,495,542 A | 2/1996 | Shimomura et al. | |
| 5,644,524 A | 7/1997 | Van Aken et al. | |
| 5,736,987 A | 4/1998 | Drucker et al. | |
| 5,793,371 A | 8/1998 | Deering | |
| 5,801,708 A * | 9/1998 | Alcorn et al. | 345/587 |
| 5,801,975 A | 9/1998 | Thayer et al. | |
| 5,831,640 A | 11/1998 | Wang et al. | |
| 5,835,097 A | 11/1998 | Vaswani et al. | |
| 5,841,442 A | 11/1998 | Einkauf et al. | |
| 5,963,744 A | 10/1999 | Slavenburg et al. | |
| 6,052,127 A | 4/2000 | Vaswani et al. | |
| 6,055,000 A | 4/2000 | Okada | |
| 6,078,334 A | 6/2000 | Hanaoka et al. | |
| 6,130,680 A * | 10/2000 | Cox et al. | 345/544 |
| 6,184,893 B1 | 2/2001 | Devic et al. | |
| 6,295,594 B1 * | 9/2001 | Meier | 711/171 |
| 6,304,268 B1 | 10/2001 | Iourcha et al. | |
| 6,433,789 B1 | 8/2002 | Rosman | |
| 6,501,851 B1 | 12/2002 | Kondo et al. | |
| 6,546,409 B1 | 4/2003 | Wong | |
| 6,580,828 B1 | 6/2003 | Li | |
| 6,825,848 B1 * | 11/2004 | Fu et al. | 345/557 |
| 6,876,362 B1 | 4/2005 | Newhall, Jr. et al. | |
| 7,023,445 B1 * | 4/2006 | Sell | 345/557 |
| 7,050,063 B1 * | 5/2006 | Mantor et al. | 345/582 |

(Continued)

OTHER PUBLICATIONS

Mark Adler, Gzappend, Nov. 4 2003, http://svn.ghostscript.com/ghostscript/tags/zlib-1.2.3/examples/gzappend.com.

*Primary Examiner* — Kee M Tung
*Assistant Examiner* — Jacinta Crawford

(57) ABSTRACT

A method and system for implementing transfers of texture data in a computer system. The method includes the step of accessing a first block of texture data in a low latency memory, the first block having a predetermined size and accessing a second block of texture data in high latency memory, the second block having the predetermined size. The first block of texture data is copied from the low latency memory to a transfer space in high latency memory having the predetermined size. The second block of texture data is written from the high latency memory to the low latency memory, wherein the second block overwrites the first block. What used to be the transfer space is now treated as the first block now placed in high latency memory, and what used to be the second block is now treated to be the new transfer space.

22 Claims, 5 Drawing Sheets

U.S. PATENT DOCUMENTS

| | | |
|---|---|---|
| 7,109,999 B1 | 9/2006 | Lindholm et al. |
| 7,126,604 B1 | 10/2006 | Purcell et al. |
| 7,224,838 B2 | 5/2007 | Kondo et al. |
| 2001/0011326 A1* | 8/2001 | Yoshikawa et al. ............ 711/119 |
| 2002/0004860 A1* | 1/2002 | Roman ............................ 710/22 |
| 2002/0147753 A1 | 10/2002 | Rao et al. |
| 2003/0016229 A1* | 1/2003 | Dorbie et al. ................. 345/582 |
| 2003/0023646 A1 | 1/2003 | Lin et al. |
| 2003/0105788 A1 | 6/2003 | Chatterjee |
| 2003/0169265 A1 | 9/2003 | Emberling |
| 2003/0206177 A1 | 11/2003 | Hoppe et al. |
| 2003/0223490 A1 | 12/2003 | Kondo et al. |
| 2004/0015659 A1* | 1/2004 | Dawson ......................... 711/129 |
| 2004/0027358 A1 | 2/2004 | Nakao |
| 2004/0151372 A1 | 8/2004 | Reshetov et al. |
| 2004/0207631 A1 | 10/2004 | Fenney et al. |
| 2005/0024376 A1 | 2/2005 | Gettman et al. |
| 2005/0110790 A1 | 5/2005 | D'Amora |
| 2005/0193169 A1 | 9/2005 | Ahluwalia |

* cited by examiner

METHOD AND SYSTEM FOR TEXTURE BLOCK SWAPPING MEMORY MANAGEMENT

FIELD OF THE INVENTION

The present invention is generally related to computer implemented graphics. More particularly, the present invention is directed towards an efficient method for accessing memory.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Texture mapping schemes were developed to enhance the images rendered by early graphics systems. Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. For example, the texture would be a picture of whatever material the designer was trying to convey (e.g., brick, stone, vegetation, wood, etc.) and would contain shading information as well as the texture and color to create the impression of a complex, dimensional surface. Texture mapping is now widely established and widely implemented in most computer graphics systems.

Modem realistic texture mapping (e.g., as required for modem 3D rendering applications) requires the manipulation of large amounts of data. Generally speaking, as a given 3-D scene becomes more realistic, the more realistic the texture map (or simply texture) being used in the texture mapping operations. Accordingly, realistic high-resolution textures can be very large (e.g., several megabytes of data). The bandwidth required for accessing such textures is also very large. The memory and bandwidth requirements can exceed the capabilities of even the most modem real-time 3-D rendering systems.

One prior art approach to alleviating texture memory and bandwidth requirements involves the implementation of various schemes whereby only certain textures that may be needed in a scene are fetched from memory on an as-needed basis. The textures are typically stored in system memory, as opposed to local graphics memory. To satisfy the bandwidth requirements and latency constraints, only those textures required by a certain scene are fetched into the local graphics memory and used in the texture mapping operations of the 3-D rendering process. Generally, the local graphics memory is much smaller than the system memory of the computer system.

For example, one prior art scheme only fetches those textures that are needed to render the visible scene (e.g., that portion of the scene within the view volume). As the scene changes (e.g., as the viewpoint of the view volume changes), other textures, or portions of very large textures, are fetched as required. This technique relies on a texture swapping mechanism to fetch needed texture data when that data is not resident in local graphics memory. These types of prior art approaches seek to keep the most frequently accessed textures within the faster local graphics memory. For example, swapping a "texture A" out of local graphics memory in favor of a more frequently used "texture B" in system memory involves allocating a memory block C in system memory of the same size as texture A and then copying texture A into texture C. Then texture A is de-allocated from the local graphics memory, and a memory block D of the same size as texture B is allocated into the local video memory freed by the de-allocation texture A. Texture B is copied from system memory into memory block D and is texture subsequently de-allocated from system memory. Of course, texture A must be at least as large as texture B.

One problem with this approach is the fact that it is generally space wise inefficient when swapping blocks of texture data between system memory and local graphics memory. For example, if the blocks of texture data are not the same size (e.g., texture block B in system memory is not the same size as texture block A in local graphics memory), memory fragmentation will occur. The different size blocks of texture data will lead to fragmentation of the limited amount of local graphics memory available to a graphics processor.

Yet another problem with this approach involves the fact that calls to allocate/destroy memory blocks generally must be implemented through the operating system. This involves a series of calls to the operating system by, for example, a graphics driver, to allocate and de-allocate blocks of memory. Such calls and context switches to the operating system are very slow in comparison to the execution of a graphics application.

The above problems increase the time required to service the texture block transfers. This delay can cause stalling of the graphics rendering pipeline. Such stalling is very harmful to real-time 3D rendering applications. The stalling often leads to choppy frame rates and other noticeable pauses when new texture data must be fetched.

Some 3D rendering applications are especially dependent on smooth and reliable access to needed texture data. For example, MIP mapping generally requires several versions of a given texture to be stored and available in local graphics memory (e.g., a full resolution version and several lower resolution versions of a texture), and hence, texture memory demands tend to be high. In a highly dynamic rendering environment where the rendered scene changes rapidly, high bandwidth low latency access to the texture data is critical to overall performance. Stalling the 3D rendering pipeline due to prior art texture block swapping rapidly leads to choppy frame rates, noticeable pauses, and similar problems as the rendered scene changes.

One prior art solution to maintaining rendering speed and frame rate is to increase the amount of local graphics memory (e.g., 128 Mb, 256 Mb, 512 Mb, etc.). Such an approach is expensive and does not improve the performance of older graphics cards having less installed local graphics memory. Another prior art solution is to increase the performance of the memory management sub-system. This approach is also expensive, in that it can require expensive high speed components (e.g., multi channel system memory, exotic high speed DDR RAM, PCIx graphics bus, etc.). Even with such components, however, there are practical limits to the degree to which the performance of the prior art texture block swapping schemes can be improved. Thus, what is needed is a more efficient way to maintain rendering speed and frame rate for those 3D rendering applications that utilize texture mapping.

SUMMARY OF THE INVENTION

Embodiments of the present invention provide a method and system for implementing texture data access for real time 3D rendering applications. Embodiments of the present invention perform texture data access operations while maintaining rendering speed and frame rate for those 3D rendering applications that utilize texture mapping.

In one embodiment, the present invention is implemented as a method for implementing transfers of texture data in a computer system. The method includes the step of accessing a first block of texture data in a low latency memory and accessing a second block of texture data in high latency memory, the first and second blocks having a predetermined size. The first block of texture data is copied from the low latency memory to a transfer space in high latency memory having the predetermined size. The second block of texture data is written from the high latency memory to the low latency memory, wherein the second block overwrites the first block. The transfer space is from now on treated to be the first block now placed in high latency memory. The memory space (e.g., in high latency memory) previously occupied by the second block now becomes the new transfer space.

I then one embodiment, a plurality of transfer spaces (e.g., scratch pads) are configured with a plurality of different predetermined sizes to accommodate a plurality of blocks of texture data having different sizes. Swapping of the plurality of blocks between the high latency memory and the low latency memory can be performed via the plurality of transfer spaces, wherein blocks having substantially the same predetermined sizes are transferred via corresponding transfer spaces having substantially the same predetermined sizes. The transfers of the blocks texture data are thus configured to avoid fragmentation of the low latency memory.

Additionally, in accordance with embodiments of the present invention, the transfers of the blocks texture data do not require any calls to an operating system of the computer system, and thus execute much faster than the prior art swapping mechanisms, thereby maintaining rendering speed and frame rate for those 3D rendering applications that utilize texture mapping, and thereby improving performance of those graphics processor subsystems having comparatively smaller amounts of local graphics memory. In this manner, embodiments of the present invention take advantage of the fact that blocks of texture data typically have a relatively constrained range of standardized sizes.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
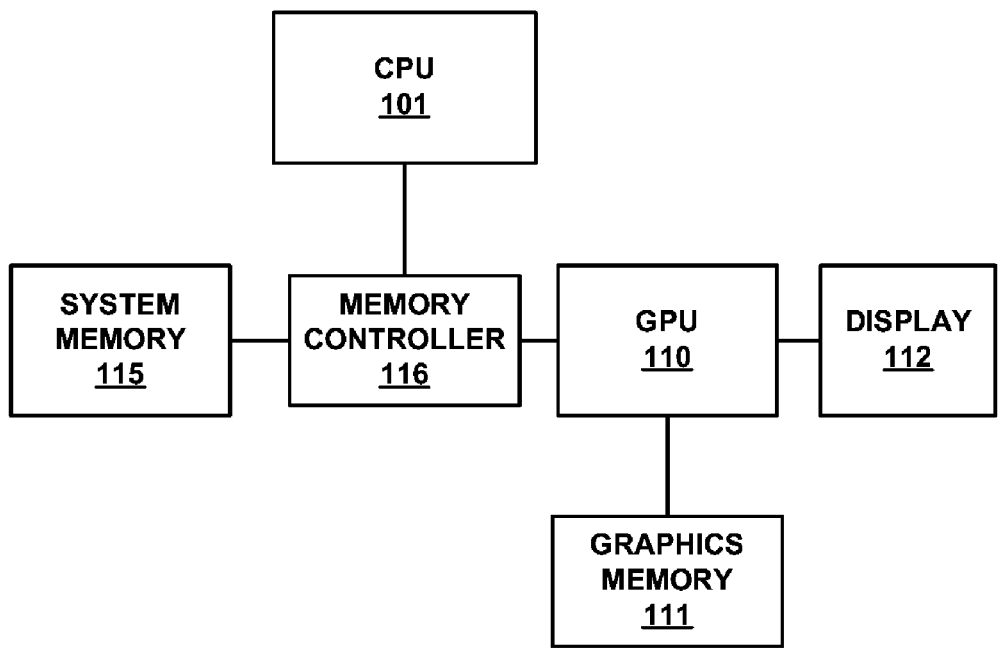
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for implementing texture data access for real time 3D rendering applications. Embodiments of the present invention perform texture data access operations while maintaining rendering speed and frame rate for those 3D rendering applications that utilize texture mapping. Embodiments of the present invention and their benefits are further described below.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with one embodiment of the present invention that provides the execution platform for implementing certain hardware-based and software-based functionality of the present invention. As described above, certain processes and steps of the present invention are realized, in one embodiment, as a series of instructions (e.g., software program) that reside within computer readable memory units of a computer system (e.g., system 100) and are executed by the CPU of system 100. When executed, the instructions cause the computer system 100 to implement the functionality of the present invention as described below.

In general, computer system 100 comprises at least one CPU 101 coupled to a system memory 115 and a graphics processor unit (GPU) 110 via one or more busses as shown. Access to the system memory 115 is typically implemented by a memory controller 116. The GPU 110 is coupled to a display 112. A local graphics memory 111 is coupled to the GPU 110 (e.g., for high bandwidth graphics data storage). System 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, 10 devices, and the like.

It should be appreciated that although the GPU 110 is depicted in FIG. 1 as a discrete component, the GPU 110 can be implemented as a discrete graphics card designed to couple to the computer system via a graphics port (e.g., AGP port, PCI Express port, or the like), as a discrete integrated circuit die (e.g., mounted directly on the motherboard), or as an integrated GPU included within the integrated circuit die of a computer system chipset component (e.g., integrated within a Northbridge chip). It should be noted that although the memory controller 116 is depicted as a discrete component, the memory controller 116 can be implemented as an integrated memory controller within a different component (e.g., within the CPU 101, GPU 110, etc.) of the computer system 100. Similarly, system 100 can be implemented as a set-top video game console device such as, for example, the Xbox®, available from Microsoft Corporation of Redmond, Wash.

EMBODIMENTS OF THE INVENTION

Figure 2:
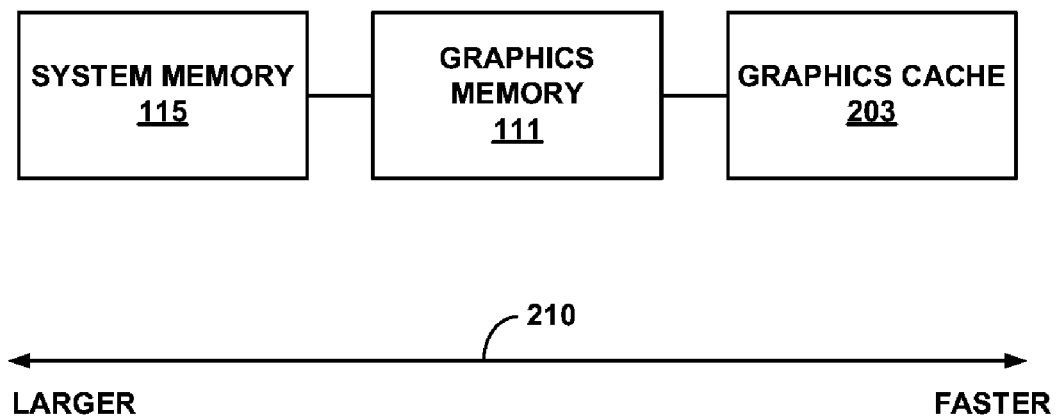
FIG. 2 shows a diagram depicting a memory interrelationship of an exemplary computer system in accordance with one embodiment of the present invention.

FIG. 2 shows a diagram depicting a memory interrelationship of an exemplary computer system in accordance with one embodiment of the present invention. As depicted in FIG. 2, three separate memories, system memory 115, graphics memory 111, and graphics cache 203 are shown. The axis 210 is depicted to indicate the relative size and relative latency of the memories.

As shown in FIG. 2, the system memory 115 of a computer system is generally larger than the graphics memory 111, as indicated by its relative location with respect to the axis 210. Similarly, the local graphics memory 111 is generally larger than the graphics cache 203 of, for example, the graphics processor unit 110. The axis 210 also indicates the relative speed of the memories. For example, the graphics cache 203 generally has a lower latency and greater data transfer bandwidth than the graphics memory 111. Similarly, the graphics memory 111 has a lower latency and greater data transfer bandwidth than the system memory 115. Embodiments of the present invention recognize and exploit these size and performance differences between the memories.

Figure 3:
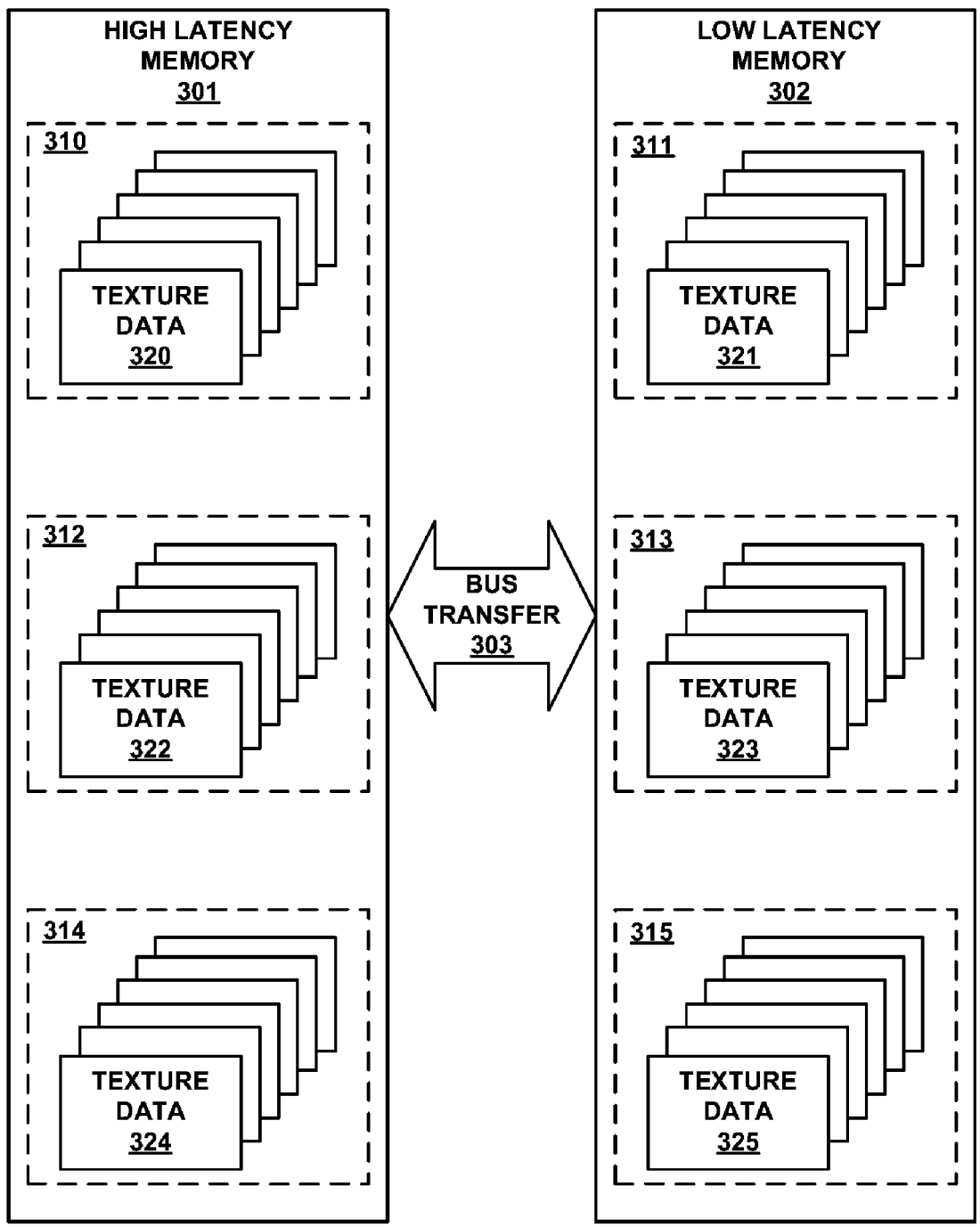
FIG. 3 shows a diagram depicting blocks of texture data stored in high latency memory and low latency memory in accordance with one embodiment of the present invention.

FIG. 3 shows a diagram depicting blocks of texture data stored in high latency memory 301 and low latency memory 302 in accordance with one embodiment of the present invention.

In one embodiment, the present invention is implemented as a method for efficiently implementing transfers of texture data in a computer system. In order to recognize and exploit the size and performance differences between a high latency memory (e.g., system memory 115) and a low latency memory (e.g., graphics memory 111), embodiments of the present invention store only those textures that are relevant to rendering a given scene within the low latency memory 302. The textures are fetched from the larger high latency memory 301 into the smaller low latency memory 302 on an as-needed basis. For example, generally only those textures that are needed to render the visible scene (e.g., that portion of the scene within the view volume) warrant storage within the limited space of the low latency memory 302.

As the scene changes (e.g., as the viewpoint of the view volume changes), other textures, or portions of very large textures, are transferred from the high latency memory 301 into the low latency memory 302 as required. Those textures within the low latency memory 302 that are no longer immediately required are transferred back to the high latency memory 301. An objective of embodiments of the present invention is to keep the most frequently accessed textures within the faster local graphics memory. Blocks of texture data are transferred between the high latency memory 301 and the low latency memory 302 via a bus 303 (e.g., AGP bus, PCI Express bus, etc.).

Referring still to FIG. 3, a plurality of blocks of texture data (e.g., blocks 320-325) in the high latency memory 301 and the low latency memory 302 are shown. In one embodiment, the blocks 320-325 are sorted into groups 310-315 in accordance with their respective sizes. For example, the blocks 320 in group 310 are all substantially the same size (e.g., 64 k, etc.), the blocks 322 in group 312 are substantially the same size (e.g., 128 k, etc.), and so on.

Figure 4:
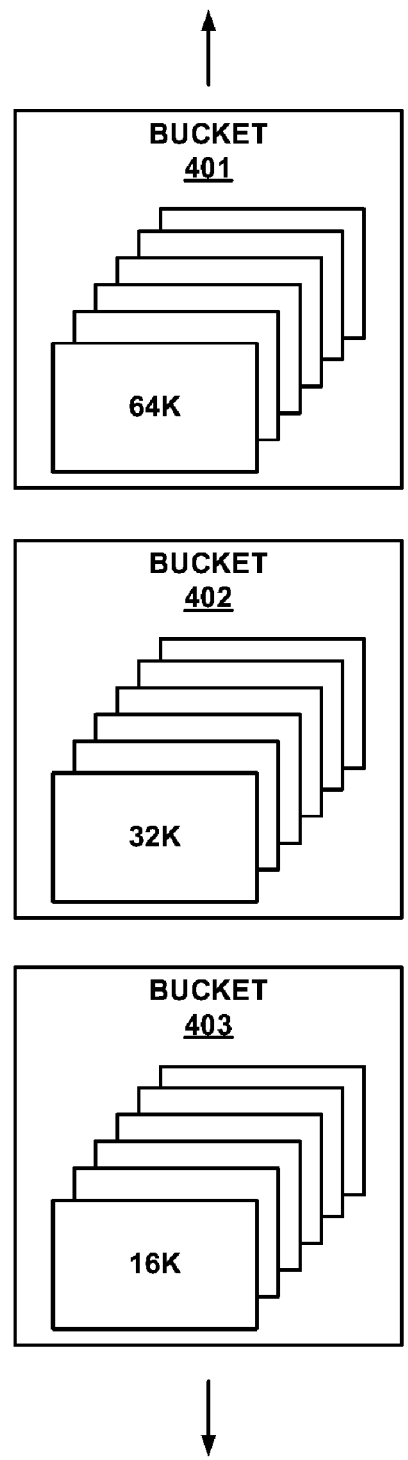
FIG. 4 shows the size relationship between different blocks of texture data and their corresponding groups, or "buckets" in accordance with one embodiment of the present invention.

FIG. 4 shows the size relationship between different blocks of texture data and their corresponding groups, or "buckets" in accordance with one embodiment of the present invention. Embodiments of the present invention take advantage of the fact that blocks of texture data typically have a relatively constrained range of standardized sizes (e.g., 2 k, 4 k, 8 k, etc.). Thus, even though a graphics application may use hundreds, or even thousands, of different blocks of texture data, the blocks of texture data are typically constrained to a certain number of predetermined sizes, typically 10 to 20 different sizes. The sizes are generally dictated by the requirements and handling interfaces of the graphics driver(s) of the GPU (e.g., GPU 110). Accordingly, 64 k blocks of texture data are sorted into a common group, referred to as a bucket (e.g., bucket 401), 32 k blocks of texture data are sorted into bucket 402, 16 k blocks of texture data are sorted into bucket 403, and so on. Depending upon the requirements of the given application and resources of the given computer system, buckets can range in size from the smallest textures (e.g., 1 k) to the largest textures (e.g., 1024 k or larger).

In one embodiment, each bucket contains a list of blocks of texture data that are of a given size that are located in the low latency memory and blocks that are of the given size that are located in the high latency memory. Accordingly, all blocks within a bucket have the same size, and memory management (e.g., swapping) is executed independently for each bucket. Each bucket is configured to use a corresponding transfer space block within a transfer space memory as a scratchpad. This scratchpad process is described below in the description of FIG. 5.

Figure 5:
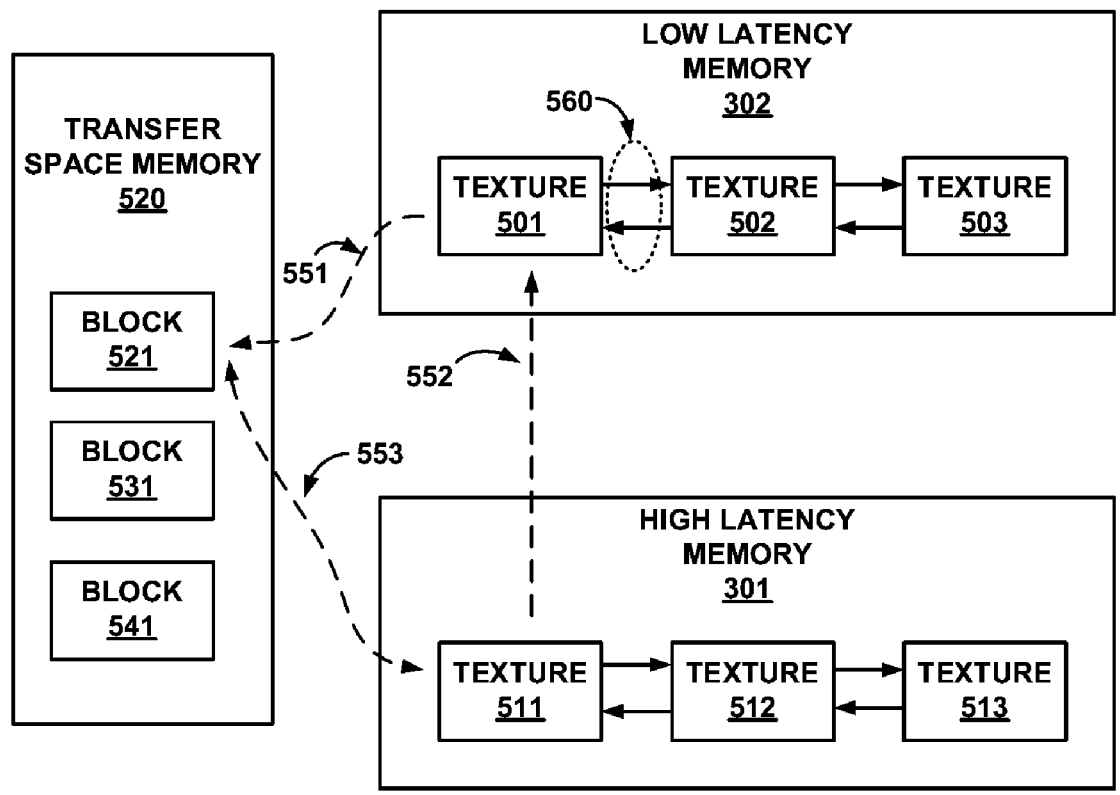
FIG. 5 shows a diagram of one implementation of a method for implementing transfers of texture data in a computer system in accordance with one embodiment of the present invention.

FIG. 5 shows a diagram 500 of one implementation of a method for implementing transfers of texture data in a computer system in accordance with one embodiment of the present invention. In the FIG. 5 embodiment, the texture data transfer process begins with the accessing of a first block of texture data 501 in the low latency memory 302 and a second block of texture data 513 in the high latency memory 301. The blocks of texture data 501-503 and the blocks of texture data 511-513 are sorted such that they are the same size (e.g., in the same size bucket).

To implement the transfer, the first block 501 is copied from the low latency memory 302 to a transfer space block 521, in the transfer space memory 520, having the same predetermined size (e.g., the same size bucket). This is shown by the dotted line 551. The second block 511 is written from the high latency memory 301 to the low latency memory 302, wherein the second block 511 overwrites the first block 501. This shown by the dotted line 552. The transfer space block 521 is from now on treated to be the first block 501 now placed in high latency memory, while what was previously the second block 511 is from now on treated to be the transfer space 501. This is shown by the dotted line 553.

In one embodiment, a plurality of transfer space blocks (e.g., transfer space blocks 531-541, etc.) are configured with a plurality of different predetermined sizes to accommodate a plurality of blocks of texture data having different sizes. For example, in an exemplary implementation where there are 20 different buckets of texture data, there would be 20 transfer space blocks within the transfer space memory 520, each having a respective size in accordance with the 20 different buckets. In such an implementation, swapping texture data blocks between the high latency memory 301 and the low latency memory 302 can be performed via the plurality of transfer space blocks, wherein texture data blocks having substantially the same predetermined sizes (e.g., sorted in the same buckets) are transferred via corresponding transfer space blocks having substantially the same predetermined sizes. The transfers of the blocks texture data are thus configured to avoid fragmentation of the low latency memory 302. In this manner, as described above, each bucket is configured to use a corresponding transfer space block (e.g., transfer space block 521) within a transfer space memory 520 as a scratchpad memory. To conserve space within the low latency memory 302, the transfer space memory 520 is typically implemented within the larger high latency memory (e.g., system memory 115). Additionally, the fact that the transfer spaces are in high latency memory also enables them to be swapped with any of the high-latency textures (e.g., by renaming them, etc.).

Additionally, in accordance with embodiments of the present invention, the transfers of the blocks texture data do not require any calls to an operating system of the computer system. Unlike prior art texture data swapping schemes, there is no need to allocate and de-allocate blocks of memory via the operating system. The texture data blocks can be swapped by, for example, graphics driver processes executing DMA transfers between system memory and local graphics memory. Since no calls to the operating system are made, the swapping process in accordance with embodiments of the present invention executes much faster than the prior art swapping mechanisms, thereby maintaining rendering speed and frame rate for those 3D rendering applications that utilize texture mapping, and thereby improving performance of those graphics processor subsystems having comparatively smaller amounts of local graphics memory. Since the blocks of texture data that have been transferred are substantially the same size, no memory fragmentation occurs.

In one embodiment, the blocks of texture data are linked to one another using a system of pointers (e.g., address pointers 560). The pointers comprise a data structure within the memory that chains the blocks of texture data together such that a most recently used (MRU) block of texture data is linked via a chain of the texture blocks to a least recently used (LRU) block of texture data. In one embodiment, when blocks of texture data must be evicted from the low latency memory 302, they are evicted on an LRU basis, wherein the least recently used block (e.g., block 501) is swapped out from the low latency memory 302 for a new block (e.g., block 511).

Embodiments of the present invention are especially useful for those texture mapping applications that place usually high demands on the texture mapping system. Because embodiments of the present invention can ensure that the most frequently used data is stored in the low latency memory and can do so without inducing a significant overhead, embodiments of the present invention provide sizable performance gains to such applications. For example, in MIP mapping functions, the blocks of texture data (e.g., from one or more different MIP map levels) can be efficiently swapped into the low latency memory on an as-needed basis without inducing overhead. Thus, for example, a MIP mapping texture operation can be implemented by the GPU accessing texture data from its local graphics memory as opposed to calling the operating system to execute swapped texture data from system memory. Additionally, because of its efficiency gains, embodiments of the present invention enable GPUs with relatively small amounts of local graphics memory (e.g., 128 MB) to perform competitively with GPUs with relatively large amounts of local graphics memory (e.g., 256 MB).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method to implement transfers of texture data in a computer system, comprising:

accessing a first block of texture data in a low latency memory, the first block having a predetermined size corresponding to a size of texture stored in said first block of texture data;

accessing a second block of texture data in high latency memory, the second block having the predetermined size based on a size of said first block of texture data;

copying the first block of texture data from the low latency memory to a transfer space in high latency memory having the predetermined size, wherein the transfer space is allocated to accommodate a block of texture data of the predetermined size, wherein said transfer space is in a location separate from said first block of texture data and said second block of texture data;

writing the second block of texture data from the high latency memory to the low latency memory, wherein the second block overwrites the first block; and accessing what used to be the transfer space as the first block in high latency memory, wherein what used to be the second block is accessed as a new transfer space.

2. The method of claim 1, wherein a plurality of transfer spaces are configured with a plurality of different predetermined sizes to accommodate a plurality of blocks of texture data having different sizes.

3. The method of claim 2, further comprising:
swapping the plurality of blocks between the high latency memory and the low latency memory via the plurality of transfer spaces, wherein blocks having substantially the same predetermined sizes are transferred via corresponding transfer spaces having substantially the same predetermined sizes.

4. The method of claim 2, wherein each of said plurality of transfer spaces corresponds to each of a plurality of predetermined sizes.

5. The method of claim 1, wherein the transfers of texture data are free of calls to an operating system of the computer system.

6. The method of claim 1, wherein the transfers texture data are configured to avoid fragmentation of the low latency memory.

7. The method of claim 1, further comprising:
sorting a plurality of blocks of texture data in the high latency memory and the low latency memory into a plurality of groups, wherein each of the groups has a different predetermined size corresponding to a size of a respective texture of each group.

8. The method of claim 7, further comprising:
implementing the transfers of the blocks of texture data between the high latency memory and the low latency memory within each of the groups, wherein transfers within each group execute independently.

9. The method of claim 1, wherein the copying is performed by a graphics driver process executing a DMA transfer.

10. A computer system for accessing texture data, comprising:
a graphics processor; and
a memory coupled to the graphics processor and having computer readable code which when executed by the graphics processor cause the graphics processor to perform a method for implementing transfers of texture data, comprising:
accessing a first block of texture data in a low latency memory, the first block having a predetermined size corresponding to a size of a texture stored in said first block of texture data;
accessing a second block of texture data in high latency memory, the second block having the predetermined size;
copying the first block of texture data from the low latency memory to a transfer space in high latency memory having the predetermined size, wherein the transfer space is allocated to accommodate a block of texture data of the predetermined size, wherein said transfer space is in a location separate from said first block of texture data and said second block of texture data;
writing the second block of texture data from the high latency memory to the low latency memory, wherein the second block overwrites the first block; and
accessing what used to be the transfer space as the first block in high latency memory, wherein what used to be the second block is accessed as a new transfer space.

11. The system of claim 10, wherein a plurality of transfer spaces are configured with a plurality of different predetermined sizes to accommodate a plurality of blocks of texture data having different sizes.

12. The system of claim 11, further comprising:
swapping the plurality of blocks between the high latency memory and the low latency memory via the plurality of transfer spaces, wherein blocks having substantially the same predetermined sizes are transferred via corresponding transfer spaces having substantially the same predetermined sizes.

13. The system of claim 10, wherein the transfers of texture data are free of calls to an operating system of the computer system.

14. The system of claim 10, wherein the transfers texture data are configured to avoid fragmentation of the low latency memory.

15. The system of claim 10, further comprising:
sorting a plurality of blocks of texture data in the high latency memory and the low latency memory into a plurality of groups, wherein each of the groups has a different p redetermined size corresponding to a size of a respective texture of each group.

16. The system of claim 10, further comprising:
implementing the transfers of the blocks of texture data between the high latency memory and the low latency memory within each of the groups, wherein transfers within each group execute independently.

17. A non-transitory computer readable media having computer readable code which when executed by a graphics processor of a computer system cause the computer system to perform a method for implementing transfers of texture data in the computer system, comprising:
accessing a first block of texture data in a low latency memory, the first block having a predetermined size corresponding to a size of a texture stored in said first block of texture data;
accessing a second block of texture data in high latency memory, the second block having the predetermined size;
copying the first block of texture data from the low latency memory to a transfer space in high latency memory having the predetermined size, wherein the transfer space is allocated to accommodate a texture block of the predetermined size, wherein said transfer space is in a location separate from said first block of texture data and said second block of texture data;
writing the second block of texture data from the high latency memory to the low latency memory, wherein the second block overwrites the first block; and
accessing what used to be the transfer space as the first block in high latency memory, wherein what used to be the second block is accessed as a new transfer space.

18. The non-transitory computer readable media of claim 17, wherein a plurality of transfer spaces are configured with a plurality of different predetermined sizes to accommodate a plurality of blocks of texture data having different sizes.

19. The non-transitory computer readable media of claim 18, further comprising:
swapping the plurality of blocks between the high latency memory and the low latency memory via the plurality of transfer spaces, wherein blocks having substantially the same predetermined sizes are transferred via corresponding transfer spaces having substantially the same predetermined sizes.

20. The non-transitory computer readable media of claim 18, wherein the blocks are transferred from the low latency memory on a least recently used basis.

21. The non-transitory computer readable media of claim 20, wherein each of the blocks of the predetermined size in the low latency memory are linked via a first plurality of pointers, and wherein each of the blocks of the predetermined size in the high latency memory are linked via a second plurality of pointers.

22. The non-transitory computer readable media of claim 17, wherein the transfers of texture data are free of calls to an operating system of the computer system.

* * * * *